(Model.)  
5 Sheets—Sheet 2.

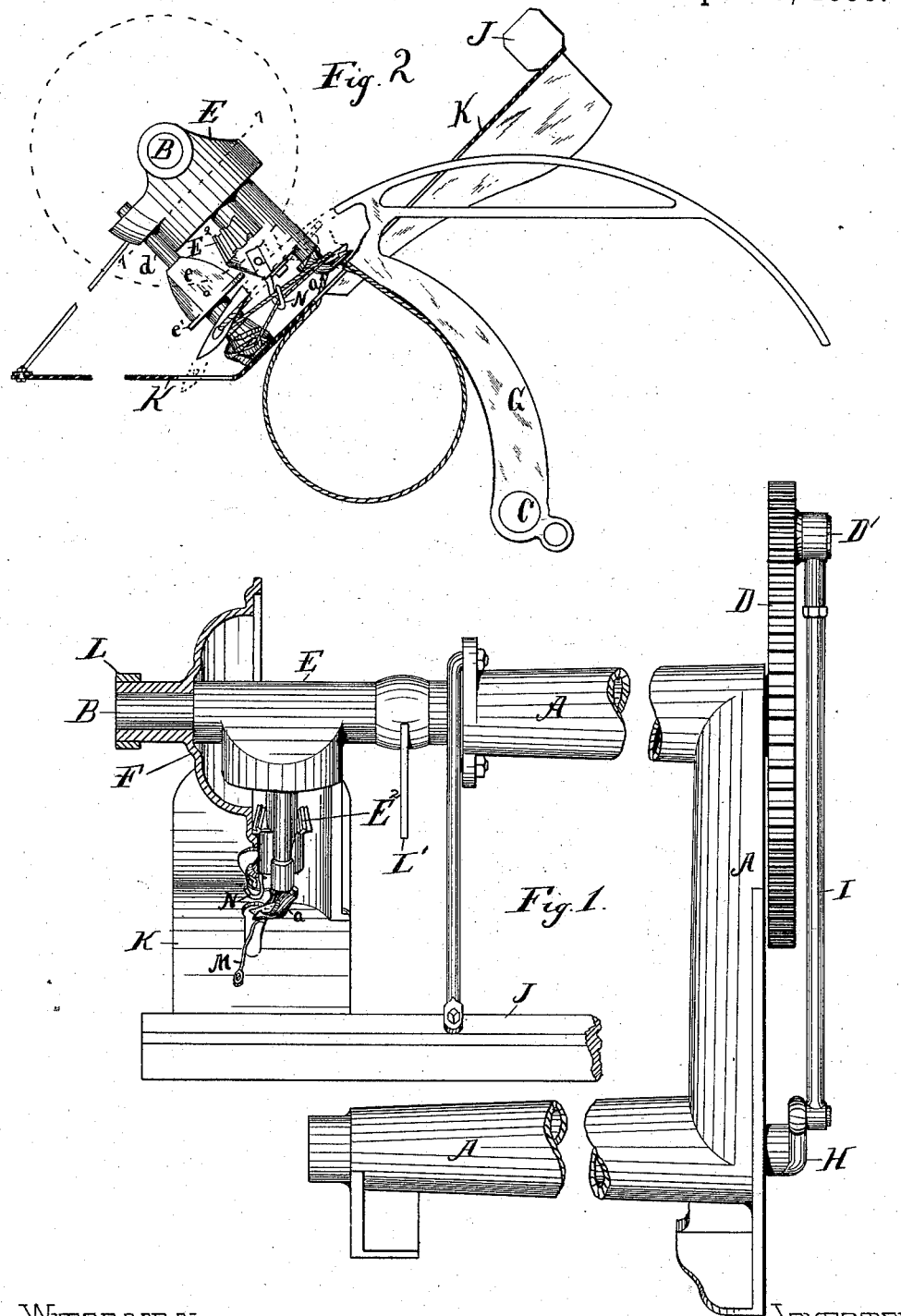

W. W. BURSON.
GRAIN BINDER.

No. 567,847. Patented Sept. 15, 1896.

WITNESSES:  
Lew. E. Curtis.  
H. M. Ring.

INVENTOR:  
William W. Burson.

(Model.)

5 Sheets—Sheet 3.

W. W. BURSON.
GRAIN BINDER.

No. 567,847.

Patented Sept. 15, 1896.

WITNESSES:
Lew. E. Curtis
M. M. Ring.

INVENTOR:
William W. Burson (Model.)  
W. W. BURSON.  
GRAIN BINDER.

No. 567,847.   Patented Sept. 15, 1896.

ATTEST—  
J. Henry Kaiser  
Harry L. Ames

INVENTOR—  
William W. Burson (Model.)  W. W. BURSON.  5 Sheets—Sheet 5.
GRAIN BINDER.

No. 567,847.   Patented Sept. 15, 1896.

Witnesses
John Imrie
Simon Messer.

Inventor
William Worth Burson.

UNITED STATES PATENT OFFICE.

WILLIAM W. BURSON, OF CHICAGO, ILLINOIS.

GRAIN-BINDER.

SPECIFICATION forming part of Letters Patent No. 567,847, dated September 15, 1896.

Application filed August 18, 1884. Serial No. 140,913. (Model.)

*To all whom it may concern:*

Be it known that I, WILLIAM W. BURSON, a citizen of the United States, residing at Chicago, Illinois, have invented a new and useful Improvement in Grain-Binders, which I make and use substantially as set forth hereinafter, and as shown in the accompanying drawings, in which—

Figure 7:
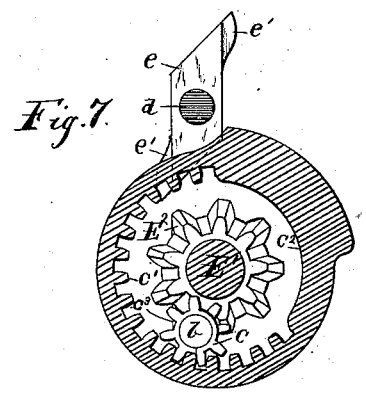
Figure 8:
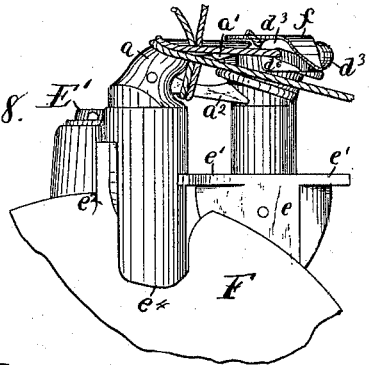
Figure 9:
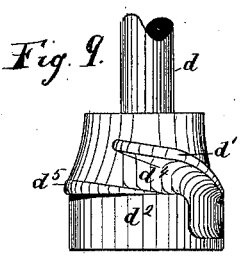
Figure 12:
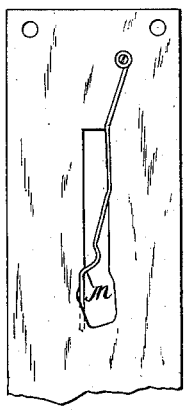
Figure 10:
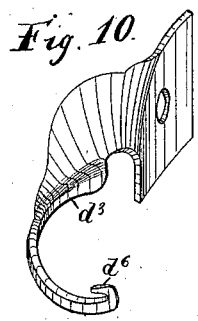
Figure 11:
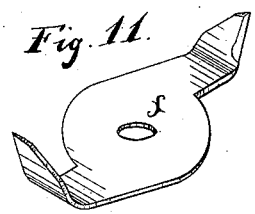
Figures 14, 15:
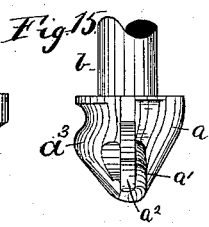
Figure 13:
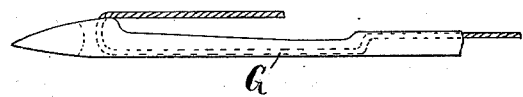
Figure 16:
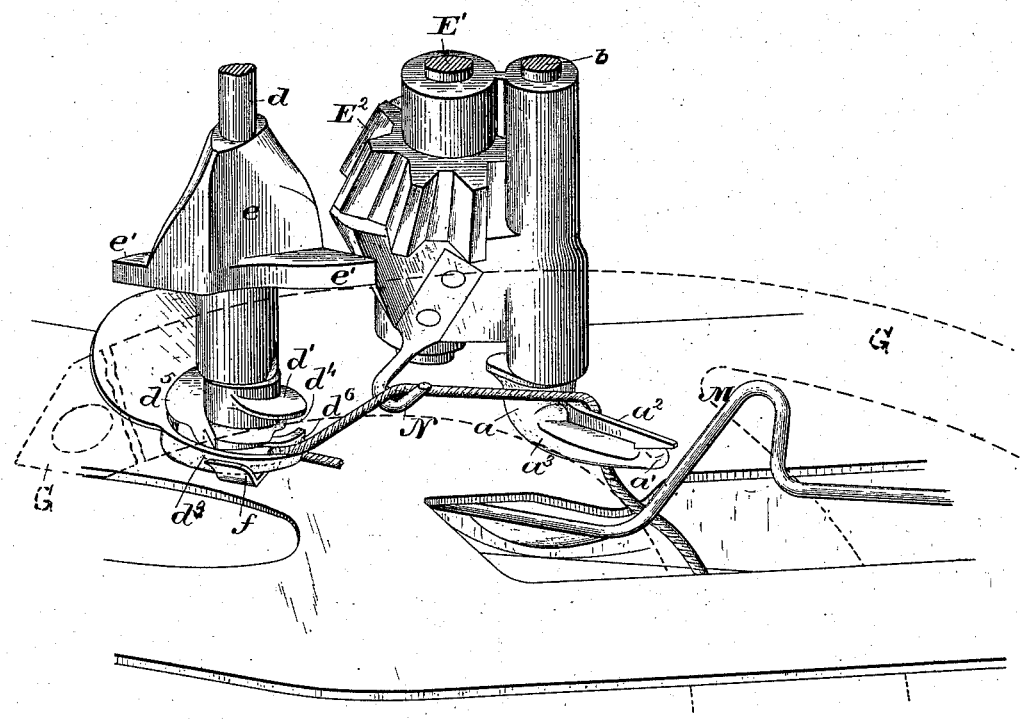
Figure 17:
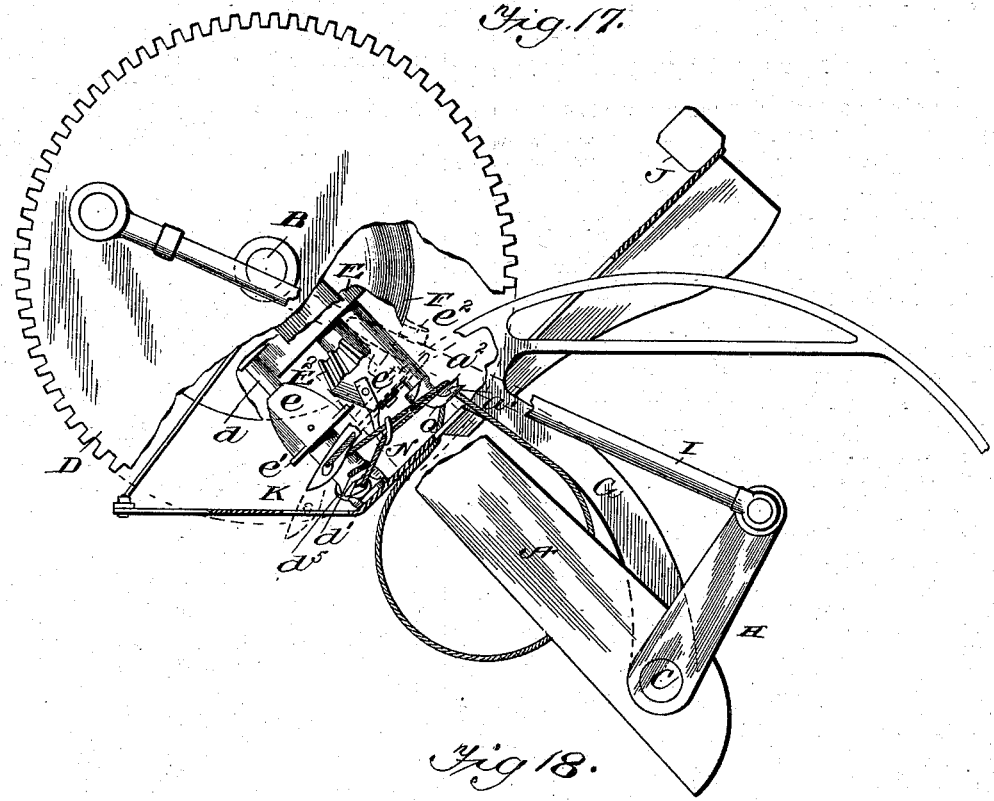
Figure 18:
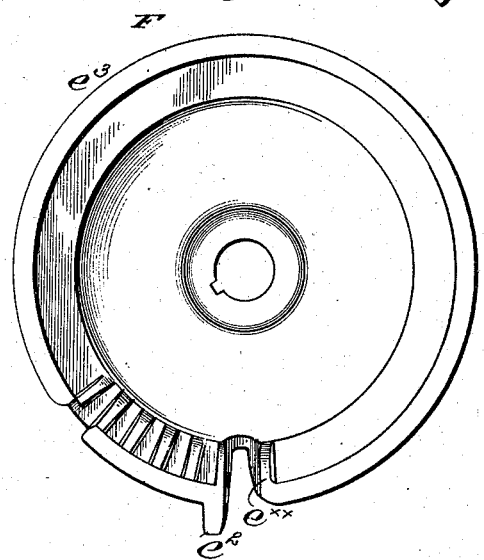

Figure 1 is a plan view with needle-arm removed. Fig. 2 is a sectional elevation of parts in position to begin tying the knot. Figs. 3, 4, 5, and 6 show tying devices in different positions in tying, cutting, and catching cord. Fig. 7 shows section on lines 7 7 of Fig. 2. Fig. 8 shows my invention applied to a knotter arranged beneath the binder-table, the parts being in position ready to grasp the cord after the loop is formed on the jaws. Fig. 9 shows the rotary part of cord-holder. Fig. 10 shows stationary part of cord-holder. Fig. 11 shows the cord-cutting knife. Fig. 12 shows cord-guide M in its relation to the slot of the breastplate. Fig. 13 shows the end of the needle-arm with the cord held ready for the knotter. Figs. 14 and 15 show the knotter $a$. Fig. 16 shows the various parts in the positions they assume after the needle has been retracted. Fig. 17 is a view looking from the right-hand end of Fig. 1, the wheel D being partly broken away to show the knotter; and Fig. 18 is an inner side view of the knotter-operating wheel.

In the drawings similar characters of reference denote the same parts throughout the several views.

My invention relates to the binding of grain with twine upon the reaper or harvester automatically; and it consists of certain combinations of devices hereinafter to be set forth.

In the drawings, A is the binder-frame, forming supports for the various devices herein explained, and is placed upon the harvesting-machine so that the grain to be bound can be conveniently brought within grasp of the needle.

Upon shaft B are shown the driving-gear D, the knotter-frame E, the knotter-wheel F, supporting discharge-arm L and discharge-arm L'. The needle G is fastened to one end of shaft C, the crank H being on the other end. The pitman I connects the crank H with the driving-wheel D by the wrist-pin D'.

E' is a stud preferably cast solid into frame E and concentric with the segmental gear $c'$ of said frame, and forms a bearing for the irregular pinion $E^2$.

J is the binder-spring rail.

K is the slotted breastplate, its upper end attached to J and its lower end to the knotter-frame E, Fig. 2.

L and L' are discharge-arms, the function of which is well understood.

M is a cord-guide adapted to place the cord upon the knotter by guiding the cord to the side of the breastplate-opening, where the knotter is placed.

N is a hook into which the cord is placed by the action of the needle and by which it is held in proper relation to the knotter to be engaged by the same.

The knotter $a$ is provided with a tooth or barb $a'$, a hinged jaw $a^2$, and a curved enlargement $a^3$ at its base below the neck of the knotter. This curved enlargement is adapted to hold the cord from slipping down upon the hinged jaw and thereby rendering it more difficult to open until such time as it is desired to strip the knot off the hook. When the knotter is in position to have the knot stripped off, Fig. 6, this enlargement offers no special hindrance to the same. The knotter $a$ is preferably cast integral with its shaft $b$, on the end of which shaft is the driving-pinion $c$. Pinion $c$ has a delay-shoe $c^3$ (seen in Fig. 7) occupying part of its face, which is adapted to move on the guide-track $c^2$, the pinion-teeth being adapted to engage with the segment $c'$, both $c^2$ and $c'$ being on the frame E.

The cord-holder shaft $d$ is supported in bearings on frame E and has the revolving parts of the cord-holder on its lower end, which parts are marked $d'$ $d'$, for the obliquely-placed opening flanges, the two cylindrical holding-surfaces $d^2$ $d^2$, and the grooves $d^4$ $d^4$, formed under the flanges $d'$ $d'$. The stationary part $d^3$ of the cord-holder is fastened to the frame E, and the operating end, provided with a hook $d^6$, presses the cord firmly against the faces $d^2$ $d^2$. The partial flanges $d^5$ $d^5$ guide the cord into the hook $d^6$. The knife $f$ is fastened to the lower end of shaft $d$ and is provided with two cutting-points, one of which shall cut upon the cord at each half-revolution of the shaft. The shaft $d$ of the cord-holder is provided with oppositely-projecting radial arms $e'$ and delay-surfaces $e$. The knotter-driving wheel F, which, it is to be understood, makes one revolution for each knotting operation, is provided with a radial tooth $e^2$ and an adjacent notch or cut $e^4$. At the proper time in the operation of the knotter this tooth $e^2$ strikes one of the arms $e'$ and turns the holder-shaft one-half a revolution, the notch $e^4$ permitting the passage of the end of the delay-shoe $e$.

The knotter-frame E is made with a sleeve to be supported on shaft B, a stud E', preferably of steel and cast solid in said frame, forming part thereof, an internal segmental gear $c'$, and guide-track $c^2$, both concentric with stud E', bearings for cord-holder shaft $d$, support for the stationary part $d^3$ of cord-holder, and a part to which breastplate K is bolted.

Figure 3:
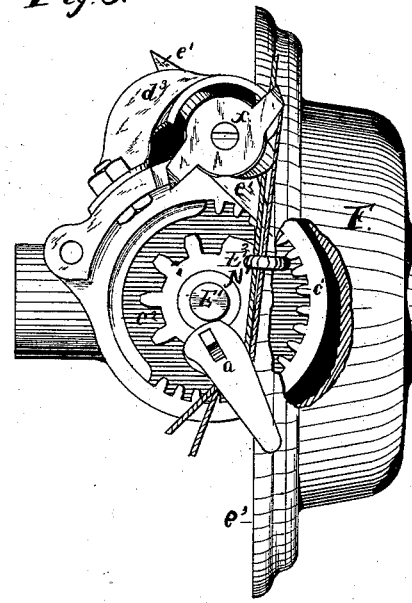
Figure 4:
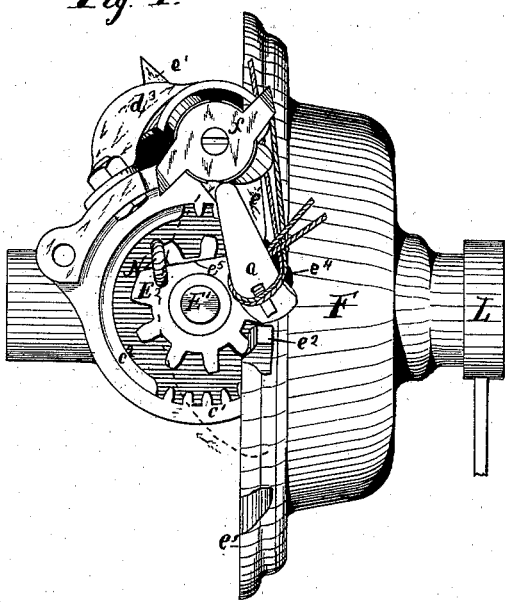
Figure 5:
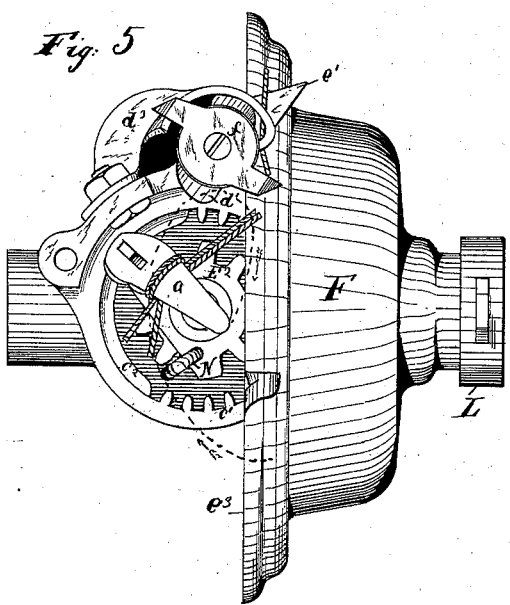
Figure 6:
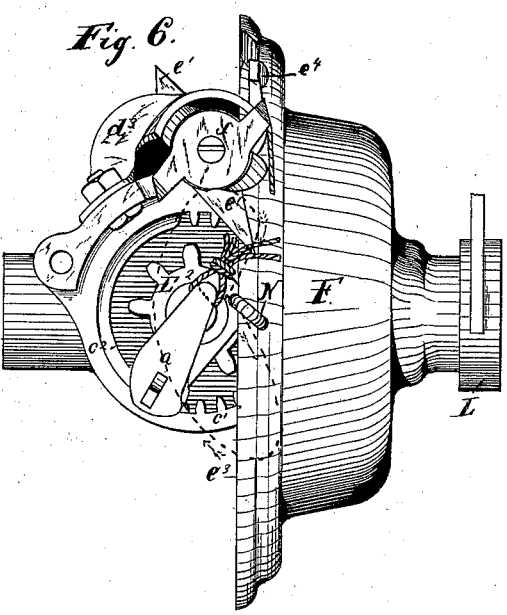

Pinion E² has a lateral sleeve-like offset which forms a bearing for shaft $b$ of knotter $a$, as also a flattened delay-surface $e^5$, Fig. 4, whereby it is held at rest by wheel F, as will be fully shown. On shaft $b$ is the spur-pinion $c$, meshing in segment $c'$. The delay-surface $c^3$ of said pinion $c$, Fig. 7, is guided by the track $c^2$ of frame E. The revolution of pinion E² carries the knotter $a$ with it, while the pinion $c$, meshing in the segment $c'$, turns the knotter in the opposite direction while in mesh and radially only while moving on the delay-surface $c^2$.

In operation motion is given to wheel D by connecting it in any convenient manner with the operating parts of the reaper.

Since the cord is grasped by the same operation by which the knot is tied in the cord-holder, I shall begin my description, assuming that the end of the cord is held by the cord-holder and the gavel encircled by the cord, the ends of which are placed in the knotting device, the several parts being in position shown in Fig. 2. The rotation of wheel D, and with it wheel F, in the direction of the arrows, Figs. 4, 5, and 6, brings the segment of said wheel into mesh with pinion E², turning the knotting-hook in the direction to grasp the two ends of the band and carry them back toward the cord-holder while forming a loop around the neck of the knotter, Fig. 4. While pinion E² is being turned by its operating-segment on wheel F, pinion $c$ on knotter-shaft $b$, meshing into segment $c'$, is turned in the opposite direction until it reaches the delay-track $c^2$, when its axial rotation ceases, and it is carried around in supporting-pinions E².

The movement of the knotter just described while forming the loop carries it toward the cord-holder and thereby avoids any strain upon the held end of the cord, acting in this respect like a paying-out device for the knotter. When the knotter in its rotation reaches the position shown in Fig. 4, the hinged jaw $a^2$ comes in contact with the opening flange $d'$ of the cord-holder $d^2$, which is placed at such an angle as to open the jaw enough to insure both ends of the band being grasped by the jaws, and the continued rotation of the pinion E² turns the knotter in position shown in Fig. 5, where the ends of the band are well drawn into the knotter-jaws. When the knotting apparatus has reached this stage, it only remains to shed the loop formed on the tying-bill over the ends held in the jaws, which is done by the knotter being carried outside the opening in the breastplate by means of the eccentric support of the knotter-shaft in pinion E², Fig. 6. At the time when the ends of the band are well secured in the jaws of the knotter, tooth $e^2$ of wheel F comes in contact with arm $e'$ on shaft $d$ and turns said shaft, whereby the groove $d^4$ is brought under the operating end of $d^3$ and the held end is released. The further turning of the revolving part of the cord-holder brings the needle end of the cord, which is at this time in groove $d^4$, under the operating end of $d^3$, (the groove $d^4$ being oblique, corresponding to the flanges $d'$ $d'$,) and hence at the proper time between the end of $d^3$ and the cylindrical part of the cord-holder $d^2$ $d^2$, where it is securely held. When the cord is thus securely held and drawn tight by the action of the knotter, the knife $f$, by its rotation, being held rigid with the cord-holder, comes against the cord thus drawn across its path and cuts it, thereby releasing the sheaf portion and having the end of the needle portion securely held for the next band. The knot is now stripped from the knotter by the joint action of the discharge-arms throwing off the sheaf and the knotter moving over the edge of the breastplate away from the needle-slot. While the knot is being stripped from the knotter and comprising about one-third of the movement of knotter-pinion $c$, this pinion is moving upon the delay-guide track $c^2$. The continued rotation of pinion E² brings pinion $c$ into engagement with segment $c'$ and thereby returns all parts of the knotting mechanism to their position of rest, Fig. 2. When the needle is being withdrawn, the cord is placed in the retaining-hook N, Fig. 16, by which it is held in proper position to be engaged by the knotter, and the further withdrawal of the needle permits the string-guide M to assume its normal position across the path of the needle in the breastplate-slot, Fig. 12, by which the cord is placed and held in the knotter. This string-guide is moved to the side of the breastplate-slot by the needle in placing the band around the sheaf and in the knotting mechanism. When the needle withdraws from the knotting device, the cord is brought into the hook $d^6$ of the cord-holder $d^3$, being guided over the point of this hook by the flanges $d^5$ and thus securely held. Since the revolving part of the cord-holder is only turned half around for each knot tied, its parts, as also that of the knife, are made in duplicate, so as to operate properly at each half-turn of shaft $d$.

In the construction and arrangement of this binder the knotter $a$ reaches well into but not across the slot in the breastplate and the needle delivers the cord from the side next to the knotter and is so shaped and the timing of the movements so arranged that it passes the knotter before the tying operation begins. This construction and arrangement make the needle perform also the function of the tucker usually employed for that purpose, insuring the placing of the incoming end of the band within the reach of the knotter. When the needle in its forward movement has placed the cord in the knotter, the latter is started before the needle is "home," that is, before it has reached its farthest forward limit, and shaft $b$, having its bearing in pinion $E^2$, is carried at about the same speed as the needle toward the cord-holder, by which movement the loop is formed about the knotter $a$ while moving to the cord-holder and while the sheaf is being compressed, avoiding by this means the strain upon the twine otherwise brought upon it. The string-guide M has an upward bend in that part coming to the knotter, which insures the cord from the retracting movement of the needle to be placed upon the knotter, which would not be the case were it straight and below the knotter.

The descriptions made in this specification are for a binder in which the knotting devices are above the grain and the needle-shaft below it. When these positions of the parts are reversed, no change in the principles of the machine would be effected, but certain expressions should be changed to suit the altered relation of the parts.

I claim—

1. In a knotting mechanism for grain-binders, the combination of a pinion, journaled in the knotter-frame and carrying a lateral, sleeve-like offset, and a knotter having its shaft journaled in the offset, the knotter-shaft pinion meshing with a gear-segment on the knotter-frame, as the first-named pinion revolves, substantially as described.

2. The pinion $E^2$ carrying a rotary knotting-hook $a$ journaled in a lateral offset therefrom, combined with a gear-wheel F, adapted to rotate the pinion, and with a rack $c'$, adapted to rotate the knotter-hook.

3. In a knotter mechanism, the combination of the wheel F, having a segment-rack, the frame E, the segmental pinion $E^2$, mounted in the frame, said pinion carrying a knotter journaled in a lateral offset therefrom, and a frame having a segmental rack and delay-track with which the pinion on the knotter-shaft engages as the pinion $E^2$ is revolved by the wheel F, substantially as described.

4. The combination of the needle, the cord-holder and the knotter, the latter being carried by the frame, and mechanism whereby the knotter is moved sidewise and toward the cord-holder while turning on its axis, and the movement of the needle is continued after the knotter starts, substantially as described.

5. The pinion $E^2$ carrying knotter $a$, combined with wheel F bearing a segmental rack, and with pinion $c$ on the knotter-shaft $b$, segmental rack $c'$ and guide-track $c^2$.

6. The rotary cord-holder provided with flange parts $d^5$ $d^5$, combined with the stationary holder-jaw $d^3$ having barb $d^6$.

7. The cord-guide M arched above the knotter-hook $a$, and adapted to guide and hold the two ends of binding-cord upon the hook.

8. The knotter-frame E, provided with rack $c'$, and delay-track $c^2$, and with central journal-stud $E'$ for the knotter-carrier, $E^2$.

WILLIAM W. BURSON.

Witnesses:
M. M. RING,
C. P. H. DOSE.